(12) United States Patent
Natarajan (10) Patent No.: US 12,108,378 B2
(45) Date of Patent: Oct. 1, 2024

(54) DYNAMIC CELL SHAPING USING LOAD INFORMATION ON TRANSMITTED BEAM PATTERNS

(71) Applicant: T-MOBILE INNOVATIONS LLC, Overland Park, KS (US)

(72) Inventor: Balamurali Natarajan, Plano, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/350,527

(22) Filed: Jul. 11, 2023

(65) Prior Publication Data

US 2023/0354288 A1 Nov. 2, 2023

Related U.S. Application Data

(63) Continuation of application No. 17/326,903, filed on May 21, 2021, now Pat. No. 11,743,881.

(51) Int. Cl.
*H04W 72/542* (2023.01)
*H04W 72/044* (2023.01)

(52) U.S. Cl.
CPC ....... *H04W 72/046* (2013.01); *H04W 72/542* (2023.01)

(58) Field of Classification Search
None
See application file for complete search history.

(56) References Cited

U.S. PATENT DOCUMENTS

| | | | | |
|---|---|---|---|---|
| 2012/0052828 A1* | 3/2012 | Kamel | ................. | H04B 17/104 455/226.2 |
| 2018/0092156 A1* | 3/2018 | Kim | ................... | H04W 72/1273 |
| 2018/0375558 A1* | 12/2018 | Takahashi | ............ | H04B 7/0695 |
| 2019/0373595 A1* | 12/2019 | Sadiq | ..................... | G01S 5/0218 |
| 2020/0099421 A1* | 3/2020 | Kumagai | .............. | H04W 72/54 |
| 2021/0368490 A1* | 11/2021 | Xu | ........................ | H04W 72/23 |
| 2022/0201700 A1* | 6/2022 | Pei | ....................... | H04B 7/0452 |
| 2022/0263558 A1* | 8/2022 | Zhu | ...................... | H04B 7/0617 |
| 2022/0322119 A1* | 10/2022 | Taherzadeh Boroujeni ................ H04B 7/088 | | |

* cited by examiner

*Primary Examiner* — Kodzovi Acolatse
(74) *Attorney, Agent, or Firm* — Shook, Hardy & Bacon L.L.P.

(57) ABSTRACT

Systems, methods, and computer-readable media herein dynamically modify the beam patterns used by an antenna array to communicate with user devices in a sector. A set of metrics are monitored and used to generate time-averaged beam quality values for a default beam pattern and then compared to a time-averaged beam quality of a subset of beams within the default beam pattern. If the time-averaged beam quality for the subset of beams exceeds a percentage of the time-averaged beam quality of the default beam pattern, the antenna array is re-assigned to communicate via a second beam pattern.

20 Claims, 6 Drawing Sheets

CALCULATE A TIME-AVERAGED BENEFIT FROM A SET OF MONITORED METRICS FOR EACH BEAM — 510

BASED ON THE TIME-AVERAGED BENEFIT, PICK THE TOP 'K' BEAMS — 520

DETERMINE THE SMALLEST BEAM PATTERN FROM THE AVAILABLE SET OF BEAM PATTERNS — 530

ASSIGN THE ANTENNA ARRAY TO BROADCAST USING THE DETERMINED SMALLEST BEAM PATTERN — 540

DYNAMIC CELL SHAPING USING LOAD INFORMATION ON TRANSMITTED BEAM PATTERNS

CROSS REFERENCE TO RELATED APPLICATIONS

This application is a continuation of U.S. patent application Ser. No. 17/326,903, filed on May 21, 2021, entitled DYNAMIC CELL SHAPING USING LOAD INFORMATION ON TRANSMITTED BEAM PATTERNS, and incorporates said application herein by reference.

SUMMARY

A high-level overview of various aspects of the invention is provided here as an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, systems, methods, and computer-readable media that employ load information to dynamically shape cells on transmitted beam patterns.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. The Detailed Description is not intended to define what is regarded as the invention, which is the purpose of the claims. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Synchronization signal blocks (SSBs), also referred to as synchronization signals, are a transmission sent by an antenna element, antenna array, or antenna at a cell site. In some aspects, the SSB may be an NR-5G specific SSB. SSBs typically consist of three components, including a primary synchronization signal, secondary synchronization signal, and a broadcast channel. SSBs are used for synchronization, cell searching, and initial beamforming. Typically, SSBs are sent in repetition, such as in bursts. In conventional systems, during Massive MIMO deployment, a network operator selects a default or static number of SSB beams used at a particular cell site. In these systems, this generic SSB beam configuration is often implemented across the market or network contributing to a less than optimal network coverage. Additionally, channel state information reference signals (CSI-RS) are used to estimate the channel and report channel quality information and may be transmitted by an antenna element, antenna array, or antenna at a cell site.

Beams, as used herein, may refer to the SSB beams or CSI-RS beams that are formed by the antennas in the antenna array of a cell site. For example, in an antenna array, some or all of these antennas are used to form the SSB beams or CSI-RS beams. An SSB beam configuration refers to the quantity beams formed by the antennas of the antenna array. In some aspects, the quantity of beams could be one, two, four, six, and larger.

Instead of the typically static beam configuration utilized at a cell site, aspects herein provide for dynamically modifying the beam patterns at a cell site based on a calculated time-averaged beam quality of the modified beam pattern. For example, when too many users move locations to a left or a right portion of the beam pattern, the lesser used side of the beam pattern will provide a reduced beam quality. Thus, by modifying the antenna array and thus the beam pattern, the number of beams broadcasting to the lesser used portion of the area serviced by the antenna array is decreased.

In practice, assume a cell site has eight SSB beams. During operation, temporal fluctuations in user traffic occur due to user movement, increase in demand, or decrease in demand. Consequently, the demand on an antenna array and thus the beam pattern varies over time. By modifying the beam pattern, improvements to coverage to compensate for fluctuations in demand can occur.

To do so, a time-averaged beam quality is calculated for each beam within a default beam pattern using a set of metrics. In aspects, the default beam pattern is the full beam pattern including all of the beams. Those metrics may include, but are not limited to, a time-average of the number of active UEs being served by the beam, a time-average of the down load traffic volume transmitted or yet to be transmitted, a time-average of the upload traffic received or yet to be received from UEs, and a time average of signal quality values. Each of these metrics is calculated for the UEs that consider these beams as strong serving cells. The time-averaged values are monitored at a cell site or a component thereof (e.g., eNodeB, gNodeB) over a configurable period of time. Once the time-averaged beam quality is determined for all beams, the top 'k' beams are selected as a subset of beams and are the beams with the highest beam qualities. The beam pattern with the lowest number of beams and includes all of the top 'k' beams is implemented at the cell site. After a pre-determined time interval, the cell site reverts back to the default beam pattern.

In one aspect, a method is provided for dynamically modifying beam patterns based on time-averaged beam quality for each beam is provided. The method comprises calculating a time-average beam quality for each beam in a default beam pattern. Based on the time-averaged beam quality, selecting the top 'k' beams, where is less than the total number of beams. Determining the smallest beam pattern available for a set of available beam patterns. Assign the antenna array to broadcast using the determined smallest beam pattern. Monitoring uplink noise at a cell site over a configurable period of time.

In another aspect, computer-readable storage media having computer-executable instructions embodied thereon is provided that, when executed by one or more processors, cause the processors to perform a method. The method includes calculating a time-average beam quality for each beam in a default beam pattern. Based on the time-averaged beam quality, selecting the top subset of beams, where the subset of beams is less than the total number of beams. Determining the smallest beam pattern available for the subset of beams from a set of available beam patterns. Assign the antenna array to broadcast using the determined smallest beam pattern.

In yet another aspect, a system for deactivating SSB beams based on uplink noise is provided. The system comprises one or more UEs and a cell site comprising a plurality of antennas forming a plurality of beams for a first beam pattern. The cell site monitors a set of metrics at the cell site. The cell site also determines the time-averaged beam quality for each beam of the first beam pattern. The cell site further determines a second beam pattern comprising at least k number of beams, where k is less than the total number of beams for the first beam patterns. Dynamically switching from the first beam pattern to the second beam pattern based on a determination that the time average beam quality for the second beam pattern is greater than a percentage of the total average beam quality for all beams of the first beam pattern.

Figure 1:
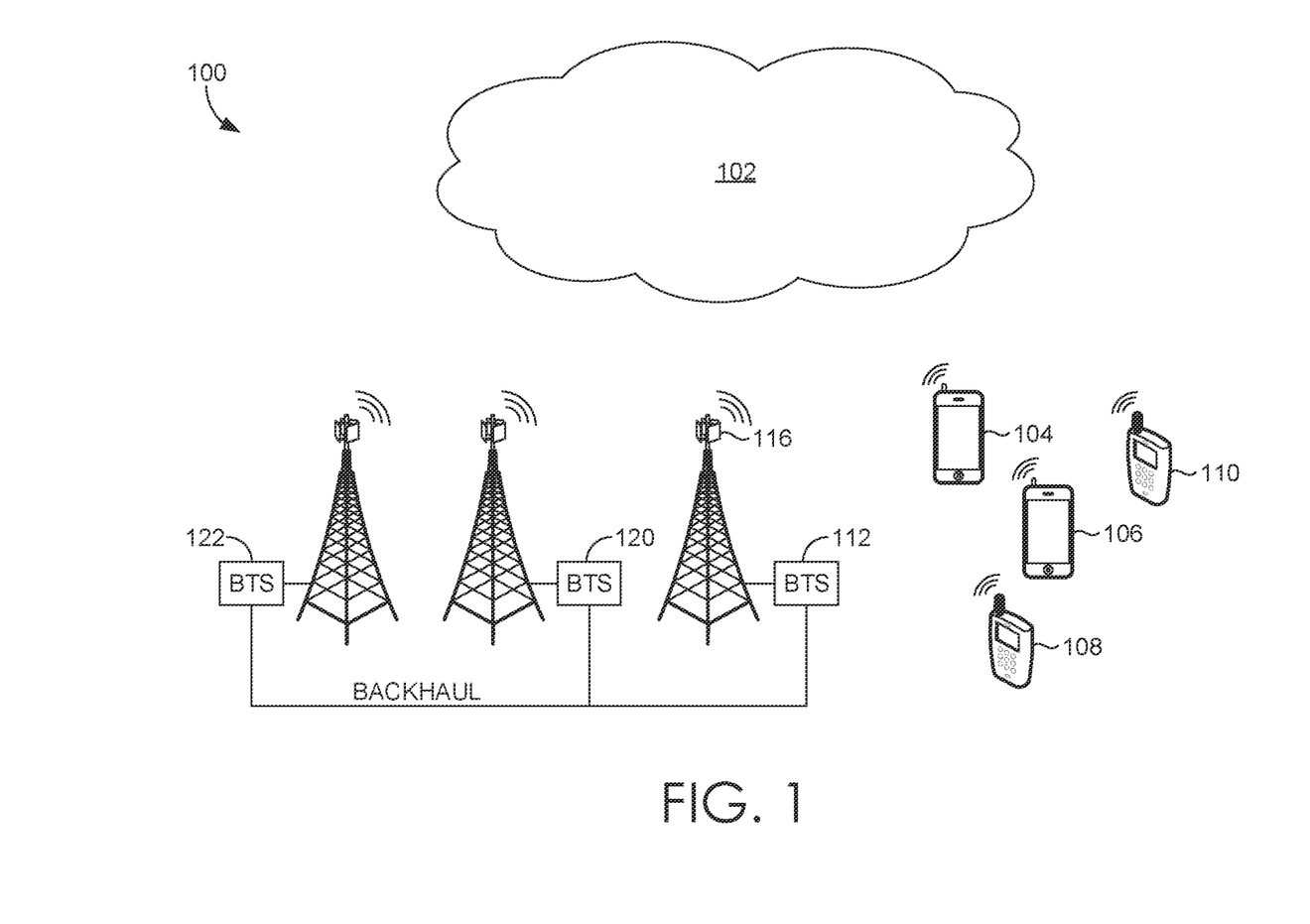
FIG. 1 depicts a schematic for an exemplary device, in accordance with an embodiment of the present invention.

Turning now to FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current UE 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

The antenna array 116 may radiate in a particular direction and thus may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE(s), and/or remote location filings that occur at the base station, all of which may be monitored dynamically and/or as stored in a data store.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 116 operates in a dual technology mode.

Accordingly, in one example, when the antenna array 116 is operating in the dual technology mode, the base station 112 concurrently acts an eNodeB (or "eNB") and gNodeB (or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base stations, for example, including legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, RF conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements may be controlled and adjusted as a group by the base station 112 using a controller, such as an MMU, independent of the second portion of antenna elements. In a similar fashion, the operations, configurations, and/or settings of the second portion of antenna elements may be controlled and adjusted as a group by the base station 112 using the controller, independent of the first portion of antenna elements. Accordingly, the base station 112 may use a controller to independently adjust different groups or portions of antenna elements within one antenna array.

In embodiments, the operations, configurations, and/or settings of each individual antenna element may be adjusted and customized. For example, the base station 112 instructs a portion of antenna elements to transmit one or more synchronization signals using a periodicity. In another example, the portion of antenna elements may transmit a plurality of synchronization signals using the periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs.

Figure 2:
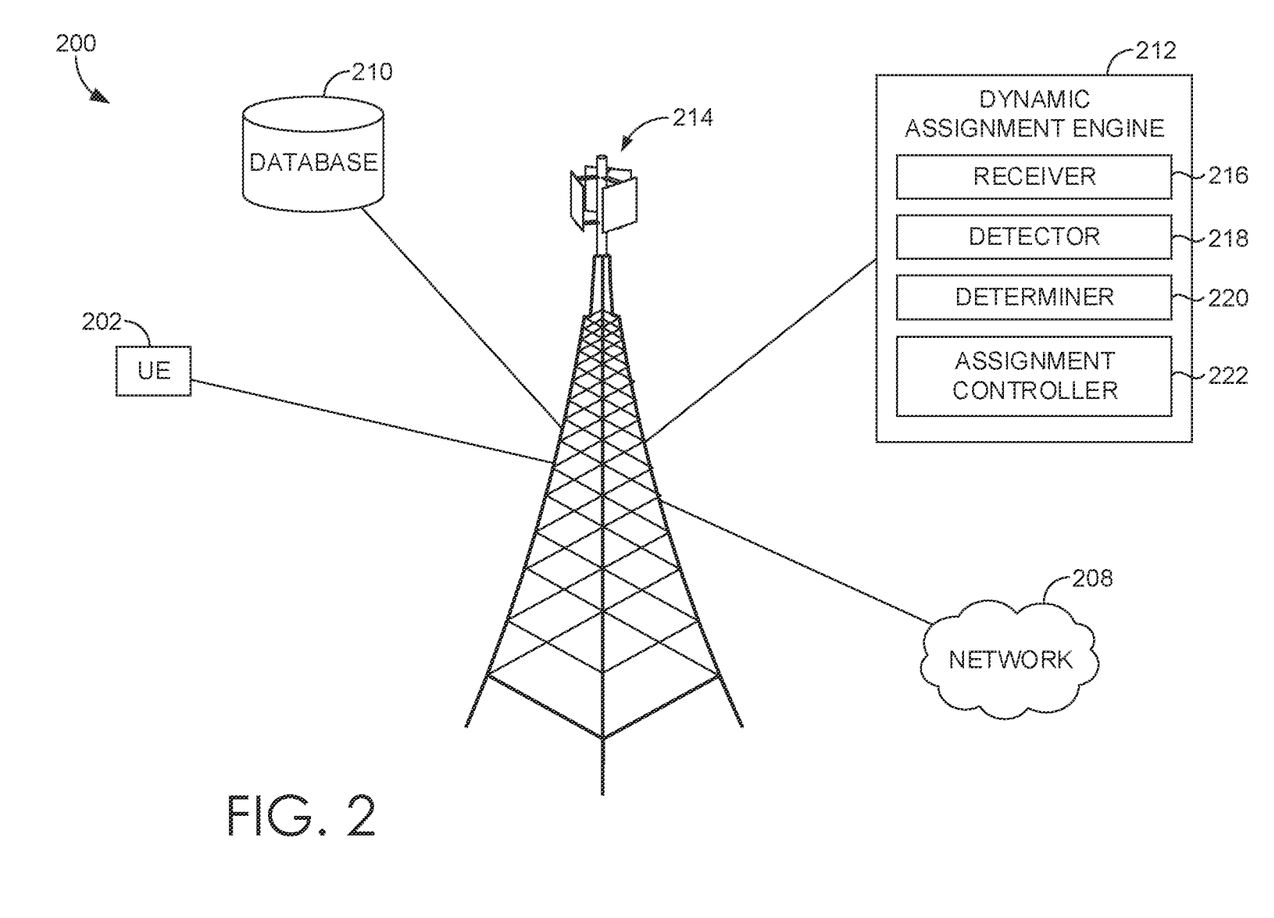
FIG. 2 depicts an exemplary telecommunications environment, in accordance with an embodiment of the present invention.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic assignment engine 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s), and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server (s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2 and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with the cell site 214.

In an exemplary aspect, the cell site 214 comprises a base station that serves at least one sector of the cell associated with the cell site 214 and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

In aspects, the antenna array associated with the cell site 214 is configured for beamforming, wherein one or more downlink signals can be transmitted in beams having different beam profiles. As used herein, a beam profile or a radiation pattern may be associated with a particular signal, set of signals, antenna, or set of antennas, and may be said to have a vertical beamwidth and a horizontal beamwidth; the horizontal beamwidth is the angular width (i.e., azimuth) of a beam and the vertical beamwidth is the angular height of the beam. For example, traditional macro cells may have an approximately a 120 degree horizontal beamwidth (i.e., a downlink signal is transmitted to user devices in ⅓ of the horizontal plane centered on the antenna) and a 15 degree vertical beamwidth. With respect to network environment 200, the downlink signal may be said to be transmitted in a beam having a vertical beamwidth. In aspects, the vertical beamwidth may be fixed (e.g., in a range of 7-15 degrees) or dynamic (e.g., using beamforming techniques, the vertical beamwidth may change in response to network conditions or UE demand). As such, the base station 112 may provide current UE 104 and 106 and legacy UE 108 and 110 with access to the network 102, in embodiments. In some embodiments, the first portion of antenna elements may communicate with current UE 104 and 106 using 5G technology, and the second portion of the antenna elements may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

As shown, cell site 214 is in communication with the dynamic assignment engine 212, which comprises a receiver 216, a detector 218, a determiner 220, and an assignment controller 222. The dynamic assignment engine 212 may connect UE 202 and other UEs to frequency bands within range of the UE 202 or other UEs for access to network 208. The dynamic assignment engine 212 may also delay or prevent UE 202 connection to a frequency band for access to network 208. The dynamic assignment engine 212 may communicate with the database 210 for storing and retrieving data.

For example, the receiver 216 may retrieve data from the UE 202, the network 208, the database 210, and the cell site 214. In some embodiments, the receiver 216 may receive requests from UEs for access to a particular frequency band. Further, data the receiver 216 may access includes, but is not limited to, location information of the UE 202 and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and channel quality information may take into account the UEs' capability, such as the number of antennas of the user device and the type of receiver used by the user device for detection. The receiver 216 may also be configured to receive information from cell sites other than cell site 214 or other processors and/or servers.

The receiver 216 may also access the active number of UEs being served by the cell site by way of feedback provided from the UEs. The UEs could feed back its strongest set of top beams based on the beams measurements. Based on that information, the base station could calculate the total number of users that has picked each individual beam as one of its strongest beams. The receiver 216 also may access the download traffic volume transmitted and yet to be transmitted from the cell site to the UEs being served by the cell site. Uplink traffic volume received and yet to be received by the cell site from the UEs being served by that cell site can be accessed. The download and upload traffic volume is calculated for each beam as the sum of the traffic volumes for each of the UEs considering that beam as one of its strongest beams. The receiver 216 can access received signal quality values of the UEs being served by the cell site. Signal quality values may consist of but is not limited to reference signal power received (RSRP), receive strength signal indicator (RSSI, reference signal received quality (RSRQ), signal to noise ratio (SINR), sector power ratio (SPR), or channel state information (CSI). Each of the accessible pieces of data from the receiver 216 may be accessed over a period of time to generate a time average. For example, the number of UEs may be accessed over a period of time in order to generate a time average of the number of UEs being served by the cell site.

Each sector corresponds to a radiation pattern of a corresponding antenna at the cell site. The shape, size, and dimension(s) of the service coverage area of the cell site are, generally, determined by an antenna's specific radiation pattern, as well as a direction, electrical tilt, mechanical tilt, installation height above the ground or surrounding geographic area, technical operating specifications, materials, obstructions (i.e., buildings, mountains, or other elevations), and power supplied to each of the first, second, and third antennas of the cell site 214, for example. The first, second, and third antennas wirelessly receive and transmit RF transmissions to and from user equipment, other antennas, other cell sites, base stations, and/or satellites in order to facilitate communications between such devices. In an embodiment, the first, second, and third antennas of the cell site capture two-way communications between the network 202 and user equipment devices that are within a geographic area corresponding to the service coverage area of the cell site.

Turning to detector 218, the detector 218 may detect UEs within a range, frequency bands, SPRs of frequency bands, and loading factors (e.g., loading volume) corresponding to frequency bands, etc. Loading factors may change depending upon the day and time of day (e.g., world events such as natural disasters, terror attacks, pandemics, or religious holiday may prompt surges of UE traffic to or from specific locations), and may be stored in the database 210. Loading factors may include cell site 214 heat signature information, cell site 214 component performance information, channel quality information, or processor load measurements. Factors affecting the heat signature information of the cell site 214 include component model, component type, manufacturer, age of a component, wear and tear due to environmental factors, etc. Further, loading factors may also include an amount of current, backhaul traffic, or an anticipated current or backhaul traffic. Additionally, factors affecting loading volume may include a quantity of users connected to each portion of a frequency band or antenna properties at a time of receiving communication parameters from UEs connected to the frequency band. Other factors affecting loading volume may also include a capacity of the frequency band and data received from the quantity of users connected to the frequency band. The data received from the quantity of users may comprise a rate at which UEs are connected to and disconnected from the frequency band.

Turning to determiner 220, the determiner 220 may determine a time-average beam quality for each beam of a first beam pattern. In some embodiments, the time-average beam quality for a beam pattern is determined using a pre-selected set of metrics which are monitored by the detector 218. As a non-limiting example, the time averaged beam quality may be calculated from a time-average of the number of active UEs being served by the beam 'N', a time-average of the down load traffic volume transmitted or yet to be transmitted 'D', a time-average of the upload traffic received or yet to be received from UEs 'U', and a time-average of signal quality values 'S'. The determiner may use a weighted average of the time-averaged metrics to calculate the time-averaged beam quality for each beam of the first beam pattern. For example, the average beam quality for each beam of the beam pattern may be determined using $W_N*N+W_D*D+W_U*U+W_S*S$, where each W represents a respective weight for the individual metric. Determiner 220 may then determine the total average beam quality for the beam pattern from the combined weighted average beam quality for each beam within the beam pattern.

Further, determiner 220 may determine a subset of beams from the beam pattern where the subset of beams comprises 'k' number of beams. Determiner 220 may then determine an average beam quality for the subset of beams. The subset of beams represent a number of beams which is less than the total number of beams. The subset of beams may be determined to be the top 'k' beams out of all the beams for the first beam pattern, where the top 'k' beams is determined based on the time-average beam quality value for each beam of the total number of beams and selecting the top time-average beam quality values. Determiner 220 may determine that the top 'k' beams have a total average beam quality which is greater than a pre-determine percentage of the total average beam quality for the beam pattern. The pre-determined percentage may be pre-determined by the site administrator and may be modified. Determiner 220 may then determine a second beam pattern. The second beam pattern being the smallest beam pattern from an available set of all beam patterns. The second beam pattern closely resembling the subset beams in their azimuth and vertical beam directions. Additionally, the second beam pattern may include all of the subset beams.

Lastly, assignment controller 222, re-assigns the cell site to broadcast using the second beam pattern in response to the determination of the second beam pattern. The assignment controller 222 may re-assign the cell site to communicate using the second beam pattern if it is determined that the total average beam quality for subset beams is determined to be greater than the pre-determined percentage of the total average beam quality of the first beam pattern. Furthermore, the assignment controller 222 may re-assign the cell site to communicate via the first or default beam pattern after a time period. This time period is pre-determined and may be modified by a site administrator.

Figure 3:
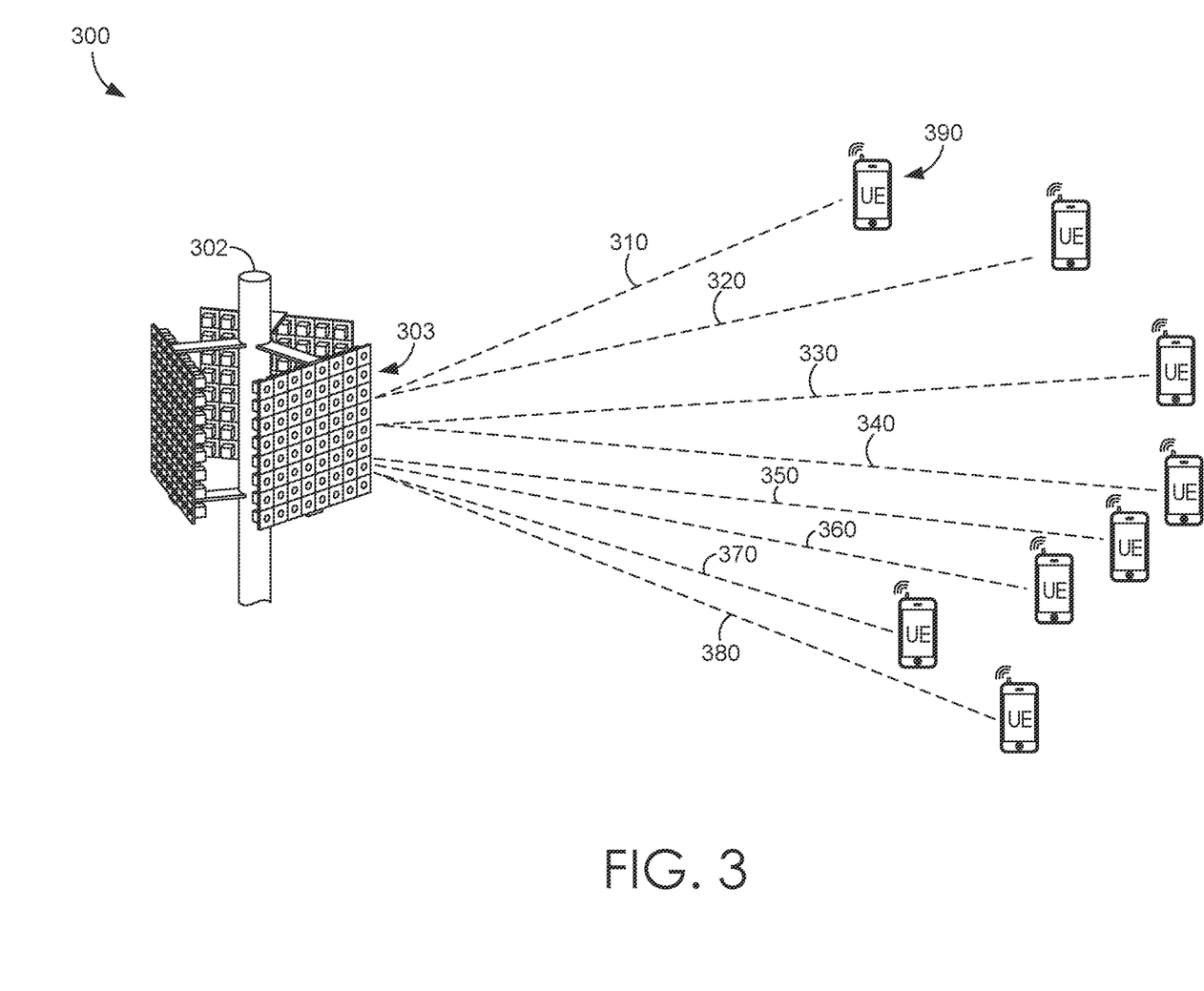
FIG. 3 depicts an exemplary schematic of the cell site, in accordance with an embodiment of the present invention.

Turning now to FIG. 3, exemplary operating environment 300 comprises cell site 302, a first antenna array 303, one or more antennas, a beam pattern comprising beam 310, beam 320, beam 330, beam 340, beam 350, beam 360, beam 370, and beam 380. In aspects, the one or more antennas may be dipole antennas, having a length, for example, of ¼, ½, 1, or 1½ wavelength. In aspects, the first antenna array 303 may be an active antenna array, FD-MIMO, massive MIMO, 3G, 4G, 5G, and/or 802.11. While we refer to dipole antennas herein, in other aspects, the one or more antennas 304 may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas of the first antenna array 303 may be applicable to an antenna array comprising any type of antenna targeting any portion of the RF spectrum (though any lower than VHF may be size prohibitive). In one aspect, the one or more antennas may be configured to communicate in the UHF and/or SHF spectrum, for example, in the range of 1.3 GHz-30 GHz.

By way of a non-limiting example, the first antenna array 303 may comprise 64 antenna elements arranged in an 8×8 structure. In other aspects, the first antenna array 303 may comprise antenna elements arranged in an 8×4, 4×8, or 4×4 configuration. Each antenna element of the first antenna array 303 comprises a dedicated power supply having a certain phase and amplitude to a respective antenna element. In an aspect, the power supply comprises a power amplifier. In an aspect not depicted in the figures, the base station may further comprise a processor. The processor may be one or more of processors, servers, computer processing components, or the like. In some aspects, the processor may be communicatively coupled to each node and/or to each antenna of each node.

In certain aspects, the first antenna array 303 may communicate or is capable of communicating with devices, using a 5G wireless communication protocol. While in this example 5G is mentioned as a wireless communication protocol, it should be understood that any wireless communication protocol standard may be utilized for example, 3G, 4G, LTE, 5G, 802.11, or any other operator-elected wireless communication protocol standard. In the aspect depicted in FIG. 3, the first antenna array 303 can include 64 antenna elements each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the first antenna array 303. In aspects, using the methods and systems disclosed herein with a high-density antenna array, such as the first antenna array 303, and using a 5G wireless communication protocol as an example, can facilitate the strategic assignment of beam indices and/or allotment of beam indices tailored for a specific purpose or environment.

Figure 4:
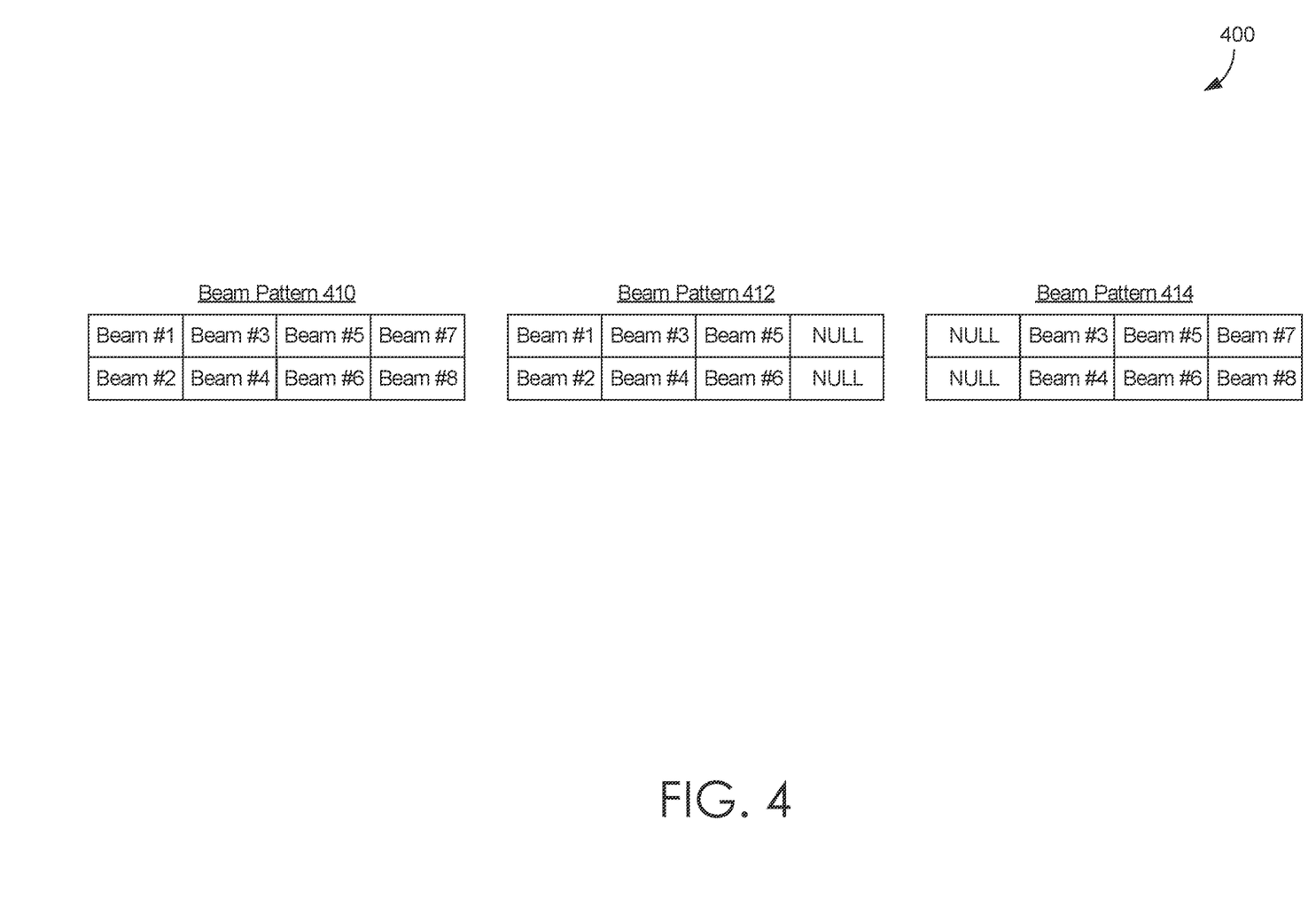
FIG. 4 depicts an exemplary schematic of available and modified beam patterns for a cell site, in accordance with an embodiment of the present invention.

By way of example, as depicted by FIG. 3 and FIG. 4, the sector or cell site is broadcasting 8 beams using beam pattern 410. Detector 218 may detect that the sector or the cell site 302 has a first beam pattern 410 which has a first average beam quality value determined by determiner 220. Additionally, determiner 220 may determine that a subset of beams, beams 1-4, have an average beam quality value which is greater than the pre-determined percentage of the average beam quality value of the first beam pattern 410. Determiner 220 may then determine that the second beam pattern 420 is the smallest of the available beam patterns, which resemble beams 1-4 in the azimuth and vertical direction and contains all subset beams. Beam pattern 414 would not satisfy the criteria as it does not contain all of the subset beams 1-4. As such, assignment controller 222 may then re-assign the cell site or antenna array to communicate via the second beam pattern 412. Assignment controller may then assign the cell site to revert to the first beam pattern 410 following a pre-defined time interval. This process is then repeated to ensure that the cell site communicating via the beam pattern with maximum beam quality.

Figure 5:
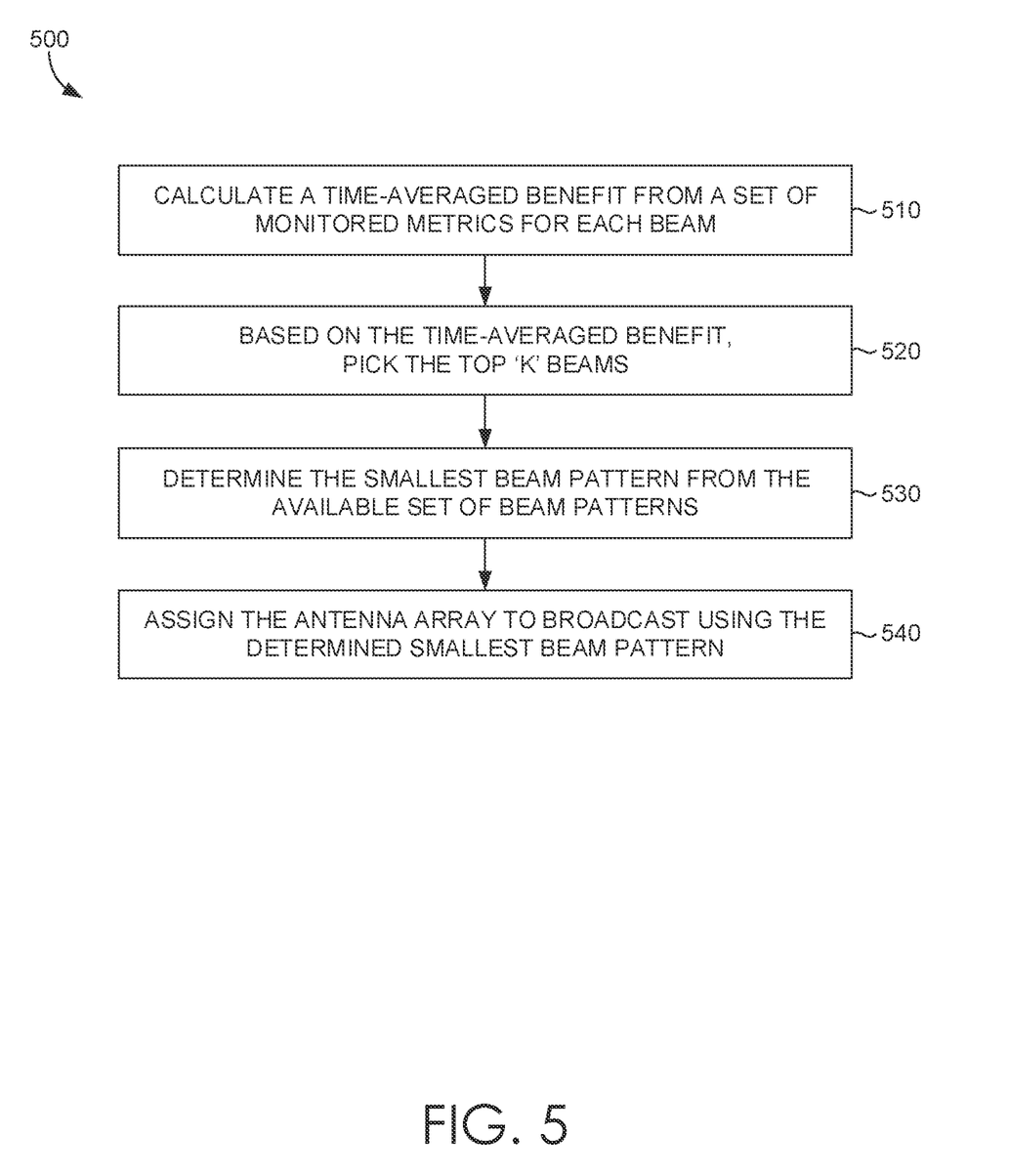
FIG. 5 depicts an exemplary method, in accordance with an embodiment of the present invention.

Turning now to FIG. 5, flow diagram 500 comprises an exemplary method dynamically switching beam patterns from a default beam pattern to a modified beam pattern. Initially at block 510, a time-averaged beam quality for each beam is calculated from a set of monitored metrics. At block 520, based on the average beam quality for all beams within the array, pick the top 'k' number of beams. The 'k' of beams represent a subset of beams and may be any number of beams less than the total number of beams and may be assigned during initial set-up of the sector or antenna array by the site administrator or modified after initial set-up. At block 530, determine the smallest beam pattern from the available set of all beam patterns that closely resembles in their azimuth and vertical directions and includes all subset beams. Further, the average beam quality of the subset beams may be checked to determine if it exceeds a certain percentage of the total average beam quality of all beams. At block 540, assign the antenna array to broadcast using the determined beam pattern rather than the default beam pattern. Additionally, following a period of time the antenna array may be re-assigned to broadcast using the default beam pattern.

Figure 6:
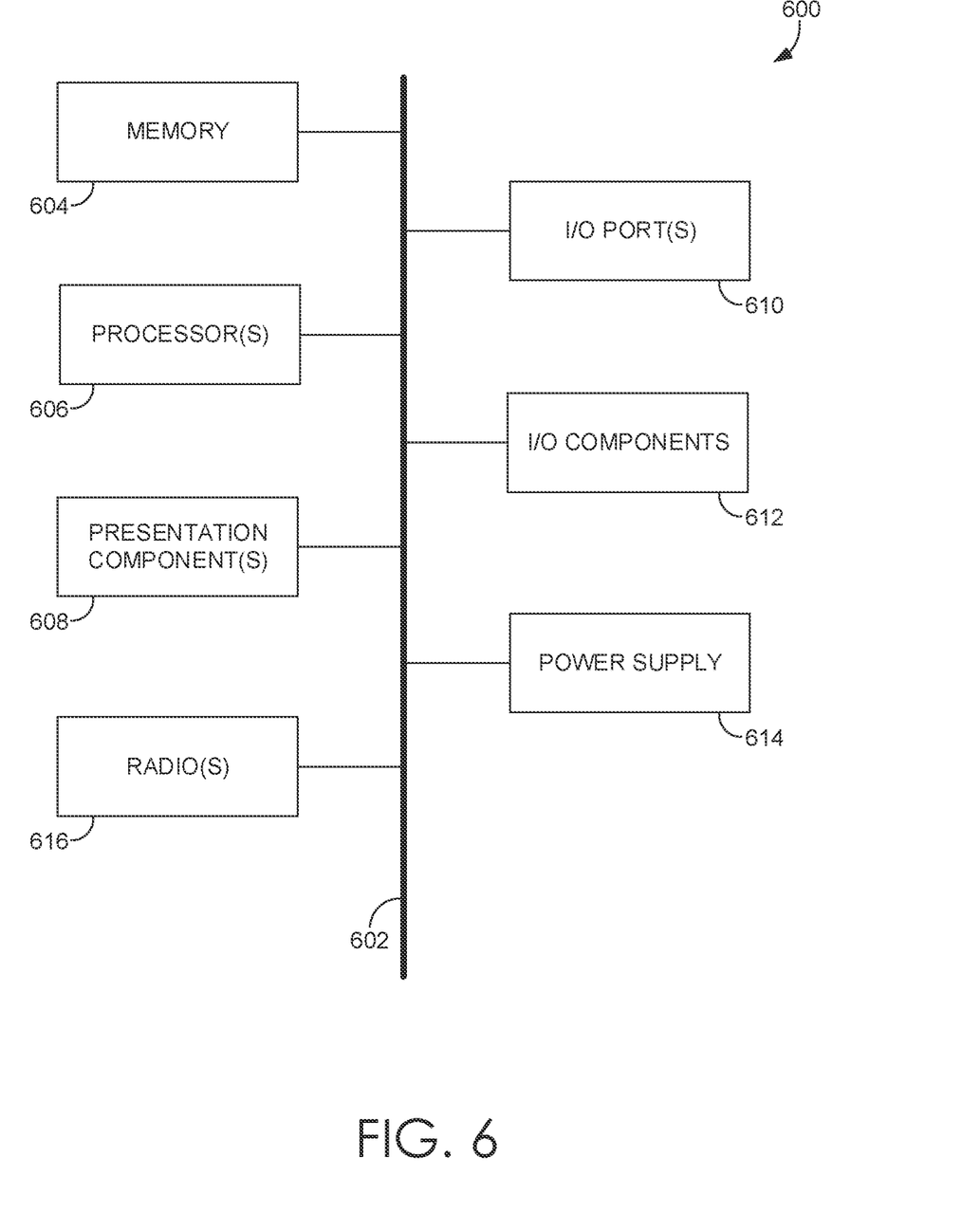
FIG. 6 depicts an exemplary computing device suitable for use in implementations of aspects herein.

Referring now to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples the following devices: memory 604, one or more processors 606, one or more presentation components 608, input/output (I/O) ports 610, I/O components 612, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 606 that read data from various entities such as bus 602, memory 604, or I/O components 612. One or more presentation components 608 presents data indications to a person or other device. Exemplary one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more non-transitory computer-readable media having computer-executable instructions embodied thereon that, when executed, perform a method for dynamically modifying beam patterns of an antenna array, the method comprising:
   communicating with one or more user devices using a first beam pattern;
   determining a time-average beam quality value for each of a plurality of beams within the first beam pattern;
   determining an average beam quality value for the first beam pattern;
   determining an average beam quality value for each subset of beams within a plurality of subset of beams of the first beam pattern;
   identifying a second beam pattern, wherein the second beam pattern comprises at least one of the plurality of subset of beams; and
   instructing the antenna array to communicate with the one or more user devices using the second beam pattern based on a determination that the second beam pattern is a smallest beam pattern of the plurality of subset of beams and that the average beam quality of the second pattern is greater than a percentage of the average beam quality value for the first beam pattern.

2. The media of claim 1, wherein the average beam quality value for the first beam pattern comprises an average of a time-average beam quality value for each beam within the first beam pattern.

3. The media of claim 2, wherein the time-average beam quality value for each of a plurality of beams within the first beam pattern is determined using a weighted average of a set of metrics.

4. The media of claim 3, wherein the set of metrics comprises one or more of:
   an active number of user devices reporting that the first beam pattern is one of its strongest serving beams;
   a download traffic volume for all user devices reporting that the first beam pattern is one of its strongest serving beams; or
   a signal quality value.

5. The media of claim 4, wherein the signal quality value comprises one or more of reference signal power received, receive strength signal indicator, reference signal received quality, signal to noise ratio, sector power ratio, or channel state information.

6. The media of claim 1, wherein the first subset of beams comprises a first number of beams, the first number of beams being less than a total number of beams in the first beam pattern.

7. The media of claim 1, wherein each of the beams within the first beam pattern and the second beam pattern comprise a synchronization signal block beam.

8. The media of claim 1, wherein the first subset of beams is identified by determining a top number of beams from the first beam pattern.

9. A method for dynamically modifying beam patterns of an antenna array, the method comprising:
   communicating with one or more user devices using a first beam pattern;
   determining a time-average beam quality value for each of a plurality of beams within the first beam pattern;
   determining an average beam quality value for the first beam pattern;
   determining an average beam quality value for each subset of beams within a plurality of subset of beams of the first beam pattern;
   identifying a second beam pattern, wherein the second beam pattern comprises at least one of the plurality of subset of beams; and
   instructing the antenna array to communicate with the one or more user devices using the second beam pattern based on a determination that the second beam pattern is a smallest beam pattern of the plurality of subset of beams and that the average beam quality of the second pattern is greater than a percentage of the average beam quality value for the first beam pattern.

10. The method of claim 9, wherein the average beam quality value for the first beam pattern comprises an average of a time-average beam quality value for each of a plurality of beams within the first beam pattern.

11. The method of claim 10, wherein the time-average beam quality value for each of the plurality of beams within the first beam pattern is determined using a weighted average of a set of metrics.

12. The method of claim 11, wherein the set of metrics comprise one or more of:
   an active number of user devices reporting that the first beam pattern is one of its strongest serving beams;
   a download traffic volume for all user devices reporting that the first beam pattern is one of its strongest serving beams;
   an upload traffic volume for all user devices reporting that the first beam pattern is one of its strongest serving beams; or
   signal quality value.

13. The method of claim 12, wherein the signal quality value comprises one or more of reference signal power received, receive strength signal indicator, reference signal received quality, signal to noise ratio, sector power ratio, or channel state information.

14. The method of 9, wherein the first subset of beams comprises a first number of beams, the first number of beams being less than a total number of beams in the first beam pattern.

15. The method of claim 9, wherein the second beam pattern comprises at least the first subset of beams.

16. A system for managing beam patterns of an antenna array, the system comprising one or more processors configured to:
   communicate, by way of the antenna array, with at least one or more user devices using a first beam pattern;
   determine a time-averaged beam quality value for each of a plurality of beams within the first beam pattern;
   determine an average beam quality for the first beam pattern;
   based on the time-averaged beam quality value, determine an average beam quality value for each subset of beams within a plurality of subset of beams of the first beam pattern;
   identify a second beam pattern which comprises one of the plurality of subset of beams of the first beam pattern; and
   instruct the antenna array to communicate with the at least one or more user devices using the second beam pattern based on a determination that the second beam pattern is a smallest beam pattern of the plurality of subset of beams and that the average beam quality value for the second pattern is greater than a predetermined percentage of the average beam quality value of the first beam pattern.

17. The system of claim 16, wherein the average beam quality value for the first beam pattern comprises an average of a time-average beam quality value for each of a plurality of beams within the first beam pattern.

18. The system of claim 17, wherein the time-average beam quality value for each of the plurality of beams within the first beam pattern is determined using a weighted average of a set of metrics.

19. The system of claim 16, wherein the predetermined percentage is set by a site administrator.

20. The system of claim 16, wherein the time-average beam quality value for each of a plurality of beams within the first beam pattern is calculated by an average of a set of metrics taken by or by a component of the antenna array over a configurable period of time.

* * * * *